Jan. 13, 1959
C. P. GRAHAM
2,868,497
HIGH-PRESSURE VALVE ASSEMBLY
Filed Aug. 2, 1954
2 Sheets-Sheet 1
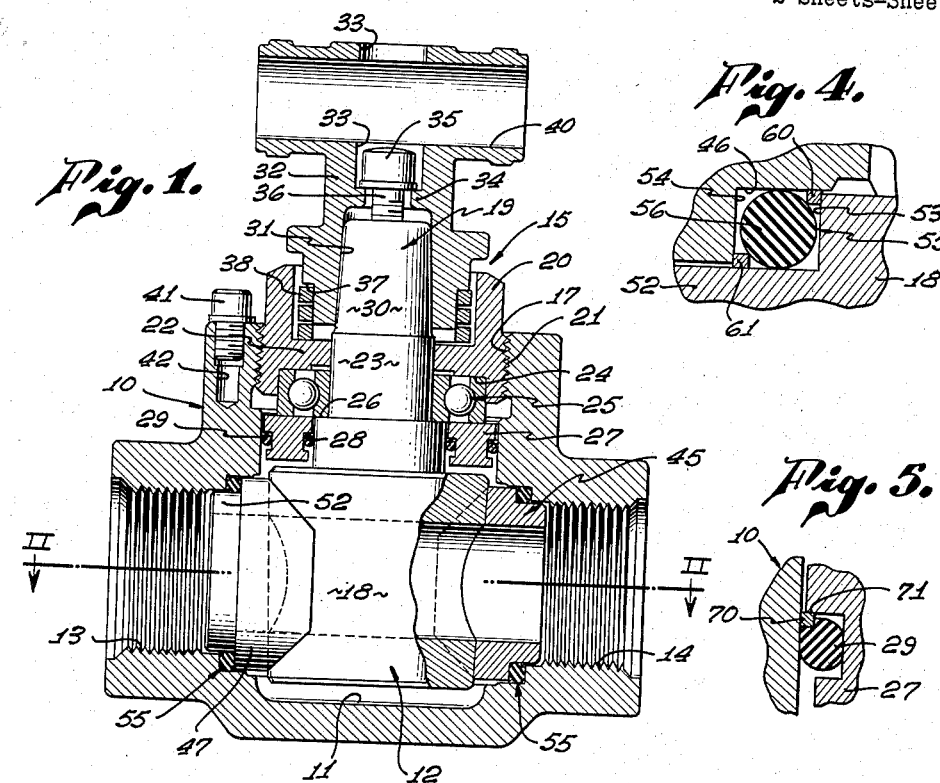
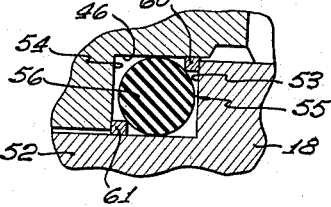
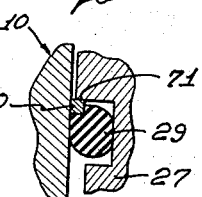
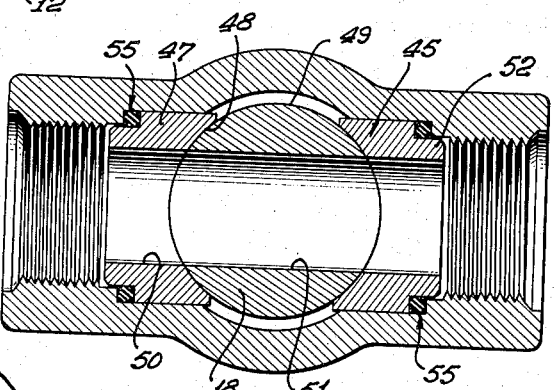
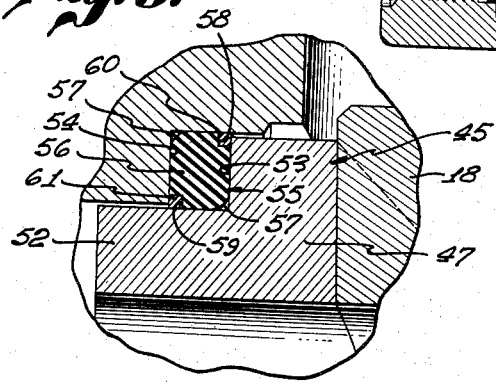
INVENTOR.
CLIFFORD P. GRAHAM,
BY
ATTORNEY.

Jan. 13, 1959 C. P. GRAHAM 2,868,497
HIGH-PRESSURE VALVE ASSEMBLY
Filed Aug. 2, 1954 2 Sheets-Sheet 2
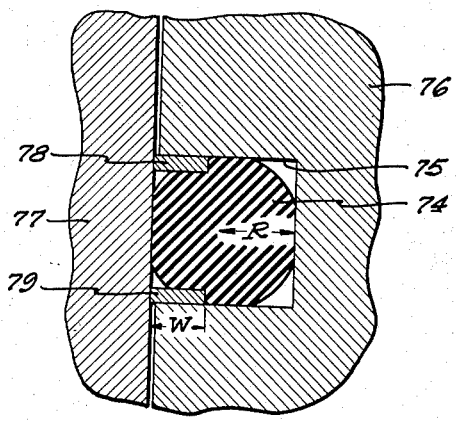
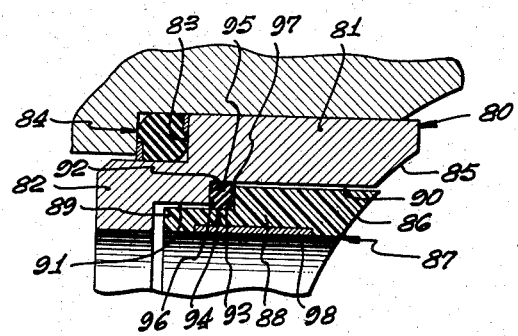
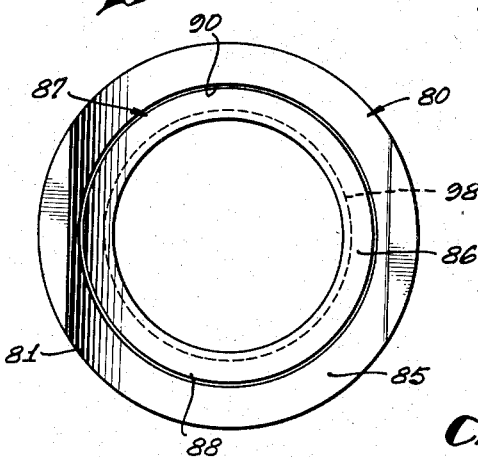
INVENTOR.
CLIFFORD P. GRAHAM,
BY
ATTORNEY.

United States Patent Office 2,868,497
Patented Jan. 13, 1959

2,868,497
HIGH-PRESSURE VALVE ASSEMBLY
Clifford P. Graham, North Hollywood, Calif., assignor to Texsteam Corporation
Application August 2, 1954, Serial No. 447,230
2 Claims. (Cl. 251—172)

This invention relates to a valve assembly and more particularly to a valve assembly provided with readily removable self-adjusting valve seat members particularly adapted for use in high-pressure fluid lines such as used in the oil well industry.

Prior plug type valve assemblies have included a valve body provided with inlet and outlet ports, each port being fitted with a ported valve seat member having an inner surface cooperably engaging a plug closure member rotatably mounted in the valve body. Such prior valve seat members were not only tightly fitted in the valve body but were secured therein as by brazing to the valve body. Obviously such an assembly of a valve seat member with the valve body was required to be carefully and accurately performed in order that the seating surface of the valve seat member which cooperably engaged a complementary surface on valve closure member would be provided with a close, tight, sliding fit. In such high pressure fluid lines, the axis of the valve closure member is often slightly deflected because of the high pressure acting on the valve member. When valve seat members are rigidly secured or fixed to the valve body, it is obvious that such deflection of the valve closure member will cause slight openings between the complementary seating surfaces of the seat member and the closure member with the result that wear rapidly occurs caused by impingement of fluid and foreign matter thereagainst under such high pressure, and the valve seating surfaces are damaged. When such seating becomes imperfect and worn, such prior valve assemblies were required to be completely removed from the pipe line for replacement of the valve seat member. In such prior valve assemblies the valve seat member was driven from the valve body by force and a new seat member installed in order to provide desired cooperable seating relationship between the valve closure member and the valve seat member.

This invention contemplates a removable valve seat member for such high-pressure plug type valve assemblies which is not brazed or rigidly secured to the valve body but which is self-adjustable to slight deflections of the valve closure member so that an effective seating engagement and seal between the valve closure member and the valve seat member is afforded at all times. The valve assembly of this invention also provides an effective sealing means for mounting said removable self-adjustable floating valve seat member within the valve body.

The primary object of this invention is to disclose and provide a novel valve assembly including a valve body, a valve closure member and a readily removable self-adjusting valve seat member cooperable with the valve closure member and the valve body.

An object of this invention is to disclose and provide a valve seat member so mounted in a valve body that the seating face of said seat member may follow the cooperable seating face of a valve closure member when deflection thereof occurs under high pressure whereby an effective closure of the valve is provided, wear between said seating faces is reduced to a minimum, and the wear is uniform.

Another object of this invention is to disclose and provide a removable valve seat member which is so mounted within a valve body so as to provide self-adjustment of the valve seat member to the valve closure member.

A further object of this invention is to disclose and provide a valve assembly wherein a removable valve seat member may be readily replaced in the valve body without disconnecting the valve body from the line in which it is installed.

A still further object of this invention is to disclose and provide a valve assembly employing removable self-adjustable floating valve seat members which is easily operated, simple to construct and manufacture, and inexpensive to make.

This invention also contemplates a novel sealing arrangement between such a removable valve seat member and a valve body in which it is installed.

The invention further contemplates the construction of a novel sealing means including yieldable resilient material and diagonally spaced rigid nonyieldable ring elements which restrain flow of said resilient material so as to maintain adjustability of a valve seat member as mentioned above while providing an effective seal.

Generally speaking this invention contemplates a novel assembly wherein a valve body is provided with inlet and outlet ports, each being encircled by an annular inwardly facing recess at its inner end. A removable ported valve seat member is provided with a cylindrical body portion which is receivable within said recess and has an inner face complementary to the seating face of a rotatable valve closure member carried by the valve body. The valve seat member also includes a cylindrical extension or stem receivable within the associated port and defining with the body portion an outwardly facing annular shoulder opposed to a wall of said recess in the valve body. A seal means is sleeved over said stem and is compressed between the shoulder and said opposed wall of the recess. Said seal means may include an annulus of resilient material and metallic ring element diagonally oppositely positioned for restraining flow of said resilient materials when under compression between the valve body and the valve seat member. The resilient seal means permits slight axial misalignment of the ported valve seat member with the axis of the port so that the seating face of the seat member may closely engage, follow, and cooperate with the complementary seating face of the valve closure member under deflection of the valve closure member when subjected to high pressure.

This invention contemplates a valve seat member provided with a primary valve seating surface of relatively soft resilient yieldable material and a secondary valve seating surface of relatively non-yieldable material.

The valve seat member contemplated by this invention includes an insert portion of resilient soft material which is carried by the valve seat member in such a manner that the insert is readily removable without removing the valve from the line.

The invention further contemplates a composite seal means for junctures between adjacent valve parts subjected to fluid pressure wherein novel cooperation between a resilient torus or annular seal member and a rigid solid ring prevents extrusion and undesired deformation of the resilient torus when under pressure.

Other objects and advantages of this invention will be readily apparent upon the following description of the drawings in which an exemplary valve assembly is illustrated.

In the drawings:

Fig. 1 is a sectional view of a valve assembly embodying this invention, the section being taken in a vertical plane bisecting the valve.

Fig. 2 is a sectional view taken in the transverse plane indicated by line II—II of Fig. 1.

Fig. 3 is a fragmentary enlarged sectional view taken in the same plane as Fig. 2 and illustrating the novel sealing arrangement of the seat member with the valve body.

Fig. 4 is a fragmentary perspective view showing in section the construction of a seal means employed in this invention.

Fig. 5 is an enlarged sectional view of composite sealing means embodying this invention and employed between the valve body and a packing plate shown in Fig. 1.

Fig. 6 is an enlarged sectional view of a different modification of an installation of a composite sealing means embodying this invention.

Fig. 7 is an enlarged sectional view of a valve insert illustrating a modification of this invention.

Fig. 8 is an end view of the modified valve seating member shown in Fig. 7, the view being taken from the right of Fig. 7.

The exemplary valve assembly shown in the drawings is designed for use in the oil well industry wherein high pressures are employed for pumping drilling fluids, cement slurries and other liquids employed in oil well operations. The valve assembly generally comprises a valve body 10 provided with a valve chamber 11 within which is positioned a ported valve closure member 12 positioned between internally threaded inlet and outlet ports 13 and 14 provided in the valve body. The threaded ports 13 and 14 afford connection to adjacent pipe sections of a line adapted to carry fluid. Means generally indicated at 15 are carried by valve body 10 for rotatably mounting the valve closure member 12 therewithin so as to regulate flow of fluid through the valve chamber 11.

The means 15 for rotatably mounting the valve closure member in the valve body may comprise an internally threaded opening 17 having an axis lying at right angles to the axis of the aligned ports 13 and 14. The opening 17 is of sufficient diameter to pass a frusto-conical ported closure portion 18 of the valve closure member therethrough for positioning said closure portion in the valve chamber. The valve closure member includes a progressively reduced stepped stem portion 19 integrally formed with the closure portion 18. The valve closure member may be supported by an adjusting nut 20 having a polygonal exterior upper surface and an externally threaded lower section engaging as at 21 the threaded opening 17 in the valve body. The adjusting nut 20 may be provided with an internally ported partition 22 which receives a reduced stem section 23 of the valve stem portion 19. The partition 22 defines a bearing recess 24 within which may be fitted an outer race of a ball-bearing means 25. The inner race of the bearing means may be fitted against the stem section 23 and positioned against a shoulder 26. A seal between the bearing means 25 and the valve chamber 11 may be provided by an annular packing plate 27 of generally "I" cross section and inner and outer seal rings 28 and 29 of O-ring type.

Above the partition 22 the valve stem portion 19 may be formed with a tapered end section 30 received within a tapered recess 31 formed in a valve actuator member 32. The axial bore 33 in the actuator member extends almost to the tapered recess 31 and may be separated therefrom by an internal annular flange 34 which affords a seat for the head 35 of a preload screw bolt 36 threaded axially in the end stem section 30. Access to the head 35 of the preload screw bolt is through bore 33. The actuator member 32 has an external downwardly facing shoulder 37 affording a seat for one end of a preload bearing spring 38, the other end of the bearing spring being seated on the partition 22. It will be apparent that tightening of the preload screw bolt 36 will draw the actuator member 32 and the stem portion 19 of the valve closure member together and cause compression of the preload bearing spring 38 between the partition 22 and the shoulder 37.

The actuator member 32 may include a horizontally extending through bore 40 in which may be inserted a suitable bar or valve operating tool for rotating the valve closure member. Lubrication of the bearing means 25 may be provided by a removable lubricant inlet plug 41 threaded in the outer end of a passageway means 42 which leads to the bearing recess.

It should be noted that the entire means for rotatably mounting the valve closure member 12 including the bearing means, the packing plate, the preload spring means and the actuator member may all be assembled in cooperable relation with the valve closure member and inserted as a unit assembly into the valve body and adjusted in position therein by adjusting nut 20. It is understood of course, that various other means may be employed for rotatably mounting the valve closure member 12 within the valve body.

This invention is particularly directed to the arrangement of the valve closure portion 18 of the valve closure member, the inlet and outlet ports 13 and 14 and a novel removable self-adjusting valve seat member 45 which is provided for each port 13 and 14. It should be noted that the valve body 10 is provided with an annular inwardly facing recess 46 of greater diameter than the inner diameter of a port. The diameter of the recess is also less than the length of the frusto-conical valve closure portion 18 so that when the valve closure portion 18 is properly positioned between the ports 13 and 14, the valve closure portion 18 will extend above and below the recess 46.

The valve seat member 45 may comprise a generally cylindrical body portion 47 having an outer diameter slightly less than the diameter of the recess 46 so as to be slidably received therewithin as best shown in Figs. 2 and 3. The valve seat member 45 may be provided with a concave slightly inclined conical inner face 48 adapted to engage in complementary relation the seating face 49 of the valve closure portion 18 so that an effective face-to-face engagement of the seating faces of the closure portion and the valve seat member is accomplished. The valve seat member 45 may be provided with an axial port 50 of less diameter than inlet and outlet ports 13 and 14 and of the same diameter as a through port 51 provided in the valve closure portion 18 so that full flow of fluid through the closure portion and the valve seat members may be afforded when the valve closure member is in full open position.

The valve seat member 45 also includes a reduced cylindrical extension or stem 52 integrally formed with said cylindrical portion and having an outer diameter slightly less than the root diameter of the threaded inlet and outlet ports 13 and 14 so that the extension 52 may be partially received within the inner end of the associated port. The extension 52 defines with the cylindrical portion 47 an outwardly facing annular shoulder 53 adapted to be spaced from and opposed to a transverse annular wall 54 of the recess 46.

A composite seal ring means 55 may be compressed between the shoulder 53 and the wall 54 to provide a fluid-tight seal for the insert member 45 when positioned in the annular recess 46 and when in seating engagement with the valve closure portion 18. A composite seal ring means 55 is best shown in Fig. 4 wherein it will be noted that said means 55 includes an annulus 56 of resilient material such as rubber, synthetic rubber, rubber compositions and the like. The resilient annulus 56 may be an O ring.

The composite means 55 also includes separate rigid nonyielding ring elements 60 and 61 preferably made from a material such as brass. The outer diameter of ring element 60 is approximately the same as the outer diameter of the annulus 56, and the inner diameter of the ring element 61 is approximately the same as the inner diameter of the annulus 56. Each of said ring elements 60 and 61 may be formed of rectangular or square cross section so as to provide rectilinear corners. When under compression between shoulder 53 and 54, the resilient annulus is deformed against the ring elements 60 and 61 to form rabbeted outer and inner edges 58 and 59 while diagonally opposite corners 57 may be curvilinear.

When the composite seal ring means 55 is installed between the shoulder 53 and the wall 54 of the recess, it will be noted that seal ring means 55 substantially fills the space therebetween and the outer ring element 60 virtually covers the opening between the outer surface of the cylindrical portion 47 and the internal surface of the recess 46 and bears against shoulder 53. Similarly the ring element 61 covers the opening or juncture between the outer surface of the stem 52 and the internal surface of the associated inlet port and bears against the wall 54. The ring element 61 and the ring element 60 are afforded sliding fits respectively with the stem 52 and the recess 46.

In assembly of the valve described above each valve seat member 45 may be equipped with a composite sealing ring means 55 by sleeving said ring means over stem 52 until it is seated against shoulder 53. Each seat member 45 with the seal ring means 55 may be then inserted through the opening 17 of the valve body and positioned in the valve body so that extension 52 is partially received within the associated port and the cylindrical portion is partially received within the recess 46. The valve closure member and the means for rotatably supporting said closure member may be assembled and then inserted as a unit into the opening 17 in the valve body. The valve closure portion 18 because of its frusto-conical configuration may be inserted between the valve seat members 45, such insertion being facilitated by the complementary configuration of the seating faces on the seat members. As the adjusting nut 20 is tightened the valve closure portion is moved further into valve chamber 11 and the valve seat members 45 are spread apart until the closure portion 18 is properly positioned. When the valve closure portion 18 is in proper position, each composite sealing ring means 55 is under compression in an axial direction and flow of the resilient material is confined to the space between the curvilinear corners of the annulus and the opposed rectilinear corners of the recess in the valve body and of the stem and shoulder of the valve seat member. Flow of resilient material between the opposed portions of the valve seat member and the valve body is restrained and prevented by the rigid nonyielding metallic ring elements 60 and 61.

When it is desired to disassemble the valve of this invention, substantially the reverse procedure is followed wherein the means rotatably supporting the valve closure member are removed from the valve body by unscrewing the adjusting nut 20. Upon removal of the valve closure portion 18 from the valve chamber 11 it will be readily apparent that the valve seat members 45 may be removed through opening 17 because they are not secured in any manner to the valve body. Such removal may be accomplished without removing the valve body from the line.

In operation of the valve assembly of this invention it will be apparent from the above description that the seating faces of the valve seat members and the valve closure portion will always remain in tight proper relationship. When the valve closure portion is in closed position and flow of fluid is stopped through the valve, the pressure of the fluid against the solid face of the closure portion 18 may cause some angular deflection of the axis of the closure portion. When such deflection occurs, the floating valve seat member may follow the closure portion so as to maintain proper seating engagement because the valve seat member is unsecured to the valve body. The pressure on the closure portion 18 is also acting against the valve seat member and such pressure will cause the valve seat member to freely follow any deflections or changes in position of the closure portion 18.

It will thus be readily apparent from the description of the floating self-adjusting valve seat member which is removably mounted in the valve body that wear between the valve seating faces of the seating members and the closure portion will be reduced to a minimum and that entry of foreign particles or matter therebetween is substantially eliminated. Also when such seating faces may become worn, the valve seat members may be readily removed from the valve body without disassembling the valve from the line in which it is operating and new seat members introduced which will readily adjust themselves to the seating faces on the valve closure portion 18. A change of the valve seating members may be accomplished in a minimum of time and with a minimum of labor. Interruption of service in the line from this cause is thereby reduced to a minimum.

As shown in Figs. 5 and 6, it will be readily understood that the extrusion-preventing rigid ring elements of the composite seal ring means may be used in combination with a resilient annulus to effect a seal between two normally coaxially aligned members, the rigid ring elements restraining deformation of the resilient annulus at selected areas to prevent damage to and loss of efficiency of the resilient annulus. In Fig. 5 outer seal ring 29 carried in an outer annular groove in packing plate 27 is restrained from extrusion between the juncture of the packing plate and the valve body by rigid extrusion ring 70. In this instance pressure of fluid acting upwardly against seal ring 29 causes the ring to be pressed upwardly in the annular groove and tightly against ring 70. The bearing of annular face 71 of the ring against the opposed wall of the groove and the sliding fit provided between the outer circumferential edge of the ring and the valve body prevents any extrusion of the resilient material of the seal ring between the packing plate and the valve body.

In Fig. 6 is exemplarily illustrated a resilient torus or O-ring 74 mounted within an annular groove 75 of a member 76. The member 76 may be coaxially aligned and received within an outer member 77 and relative movement is afforded between the two members. Extrusion-preventing rings 78 and 79 may be provided within the groove 75 adjacent the juncture of edges of said groove with the member 77. It should be noted that the extrusion rings 78 and 79 are related to the resilient torus 74. The resilient torus 74 has a circular cross section provided with a radius R. The outer diameter of each of the extrusion rings 78 and 79 is approximately the same as the outer diameter of torus 74 and provides a sliding fit within member 77. The width W of each ring 78 and 79 is preferably not less than .3 the radius R nor more than .8 radius R. If the width were less than .3, the bearing of an annular face of the ring 78 against the internal margin of the wall of the groove would be insufficient to support the ring properly when under pressure. If the width of the ring is greater than .8 R, then the desired coaction under pressure conditions, between the resilient torus and the inner circumferential edge of the ring would not be achieved.

The use of two rings 78 and 79 affords a seal against fluid under pressure acting on either side of the O-ring, or when a vacuum condition exists on one side of the annular groove.

It will thus be readily apparent to those skilled in the art that a novel composite sealing means is provided by the coaction between an annular resilient sealing member and one or more rigid annular extrusion-preventing rings movable with respect to the resilient member and having one of their diameters approximately the same dimension as the corresponding diameter of the resilient member. The rings prevent extrusion between the junctures of two associated members and thereby increase the life of the seal and prevent damage thereto.

In Figs. 7 and 8 is exemplarily illustrated a modified removable composite valve seat member for use in a valve body as illustrated in Fig. 1. The insert member 80 may comprise a main cylindrical body portion 81 of selected outer diameter and provided with a reduced extension or tail 82 forming a shoulder 83 adapted to face an internal shoulder provided on the valve body and encircling a port for fluid therein. The tail 82 extends into the port as described in Fig. 1. Seated on extension 82 may be a composite sealing means 84 of the character described above and shown in Fig. 3 so as to permit effective sealing of the valve seat member and to afford ready removal thereof from the valve body.

The main cylindrical body portion 81 of the member 80 provides a secondary seating surface 85 for cooperable seating relation with a valve plug member. A primary seating surface 86 for engagement with a valve plug member is provided on a removable insert portion 87. The insert portion 87 may be made of any suitable relatively soft resilient synthetic composition material, such as Teflon, which is resistant and noncorrosive to the type of fluid which is intended to be controlled by the valve. Preferably the resilient material also has a relatively low coefficient of friction so that the sliding contact between the valve plug and the insert portion is in effect self lubricated.

The insert portion 87 is provided with a longitudinal cross section of generally the same configuration as that of the valve insert member 80 and includes a main cylindrical portion 88 having a reduced tail or extension 89. The main cylindrical portion 81 of member 80 is provided with an enlarged recess 90 defining with a reduced recess 91 an inwardly facing shoulder 92 which opposes an outwardly facing shoulder 93 on the insert portion 88. Between the shoulders 92 and 93 may be provided a composite sealing means 94 of the type described above and comprising a resilient torus 95 and inner and outer extrusion-preventing rigid rings 96 and 97. The insert portion 87 may be reinforced about its inner diameter by an internal rigid band 98.

It will thus be noted that the insert portion 87 is readily removable mounted within the insert member 80 and that seal means is provided between the insert portion and the seating member. When the insert member is not under pressure, the face 86 normally projects above the seating face 85 of member 80 a selected distance of about .020 of an inch. Thus when a composite valve seating member 80 is assembled in a valve body and with a valve plug, the seating face 86 affords a primary self-lubricated, resilient seating surface which is relatively soft and provides a tight sealing contact with the valve plug. When the insert portion 87 becomes worn, it may be readily removed by reason of the method of sealing embodying the composite sealing means 94.

In the various embodiments of this invention disclosed above, it should be particularly noted that the reduced extensions provided on the seating member and the valve insert portion serve to guide the insert member or portion into proper relation with the part with which it is associated and permits the valve seating member to move longitudinally in the direction of the flow path of fluid without becoming misaligned with respect to the valve plug member. Thus, longitudinal play of the valve seat member (or insert portion) is provided, and deflection of the axis of the valve plug member will not cause defective seating contact.

It should also be noted that in the embodiment showing the composite valve seat that in the event of fire in the line, destruction of the primary seating surface will not make the valve inoperable but that the secondary seating surface will function to maintain the valve closed because of the fact that the resilient seal member 84 is normally under compression and will urge the seating member tightly against the valve plug.

It will be understood that various modifications and changes may be made in the valve assembly described above that come within the spirit of this invention, and all such changes and modifications coming within the scope of the appended claims are embraced thereby.

I claim:

1. In a valve assembly, the combination of: a valve body provided with inlet and outlet ports and provided with an annular inwardly facing recess encircling each port defining an inwardly facing shoulder; a rotatable ported valve member positionable between said ports; a removable ported composite valve seat means for each of said ports, each valve seat means comprising an outer cylindrical metal body portion and an inner coaxial cylindrical resilient body portion mounted within the outer body portion for relative longitudinal movement, said resilient body portion having a face normally positioned inwardly of the corresponding face on said metal body portion, both of said faces being sealingly engageable with said valve member, each body portion including a reduced cylindrical extension, the extension on said outer metal cylindrical body portion defining with said recess an annular space between said extension and said valve body, and said extension on said resilient cylindrical body portion defining with a shoulder formed on said metal cylindrical portion an annular space; and seal means in each of said annular spaces, each seal means including a resilient seal ring yieldable and deformable within its respective space cooperating to resiliently urge the inner body portion into engagement with the valve member, and a metal ring element positioned at inner and outer circumferences of each resilient seal ring to restrain flow of said resilient material and to confine said resilient material within said annular space.

2. In a valve assembly as stated in claim 1 wherein reinforcing means are provided for said inner resilient body portion to limit radial inward flow thereof.

References Cited in the file of this patent

UNITED STATES PATENTS

| | | |
|---|---|---|
| 2,030,458 | McKellar | Feb. 11, 1936 |
| 2,151,442 | Roberts | Mar. 21, 1939 |
| 2,349,170 | Jackman | May 16, 1944 |
| 2,420,104 | Smith | May 6, 1947 |
| 2,529,412 | Parker | Nov. 7, 1950 |
| 2,628,060 | Parker | Feb. 10, 1953 |
| 2,731,036 | Hughes | Jan. 17, 1956 |

FOREIGN PATENTS

| | | |
|---|---|---|
| 925,794 | France | of 1947 |
| 835,448 | Germany | of 1952 |

OTHER REFERENCES

"Industrial and Engineering Chemistry," vol. 38, 1946, pp. 871–877, published by American Chemical Society, 1155 16th St., N. W., Washington 6, D. C. (Copy in Scientific Library.)